Figure 1:
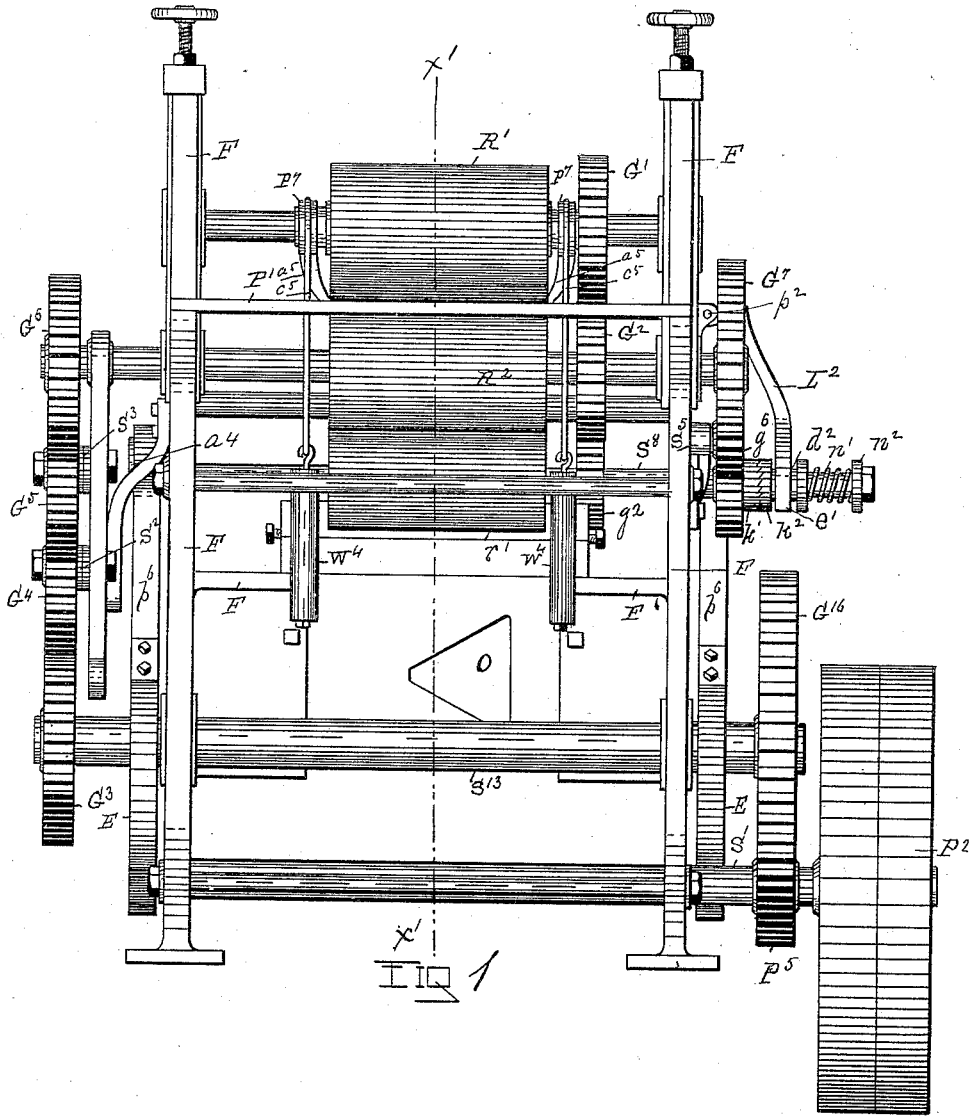

(No Model.)  7 Sheets—Sheet 1.
G. E. HILLS.
MACHINE FOR CUTTING COLLAR OR CUFF BLANKS.
No. 427,572. Patented May 13, 1890.

WITNESSES  INVENTOR (No Model.)

G. E. HILLS.

MACHINE FOR CUTTING COLLAR OR CUFF BLANKS.

No. 427,572.

7 Sheets—Sheet 2.

Patented May 13, 1890.

WITNESSES

INVENTOR
George E. Hills
by W. E. Hagan atty (No Model.) 7 Sheets—Sheet 3.
G. E. HILLS.
MACHINE FOR CUTTING COLLAR OR CUFF BLANKS.

No. 427,572. Patented May 13, 1890.

WITNESSES
William A. Lurtt
Charles S. Brimtnall

INVENTOR
George E. Hills
by W. E. Hagan atty (No Model.) 7 Sheets—Sheet 4.

G. E. HILLS.
MACHINE FOR CUTTING COLLAR OR CUFF BLANKS.

No. 427,572. Patented May 13, 1890.

WITNESSES
William A. Surat
Charles S. Pauntwall

INVENTOR
George E. Hills
by W E Hagan Atty (No Model.) 7 Sheets—Sheet 5.
G. E. HILLS.
MACHINE FOR CUTTING COLLAR OR CUFF BLANKS.

No. 427,572. Patented May 13, 1890.

WITNESSES
William A. Sweet
Charles S. Raintrall

INVENTOR
George E Hills
by W E Hagan atty (No Model.) 7 Sheets—Sheet 7.

G. E. HILLS.
MACHINE FOR CUTTING COLLAR OR CUFF BLANKS.

No. 427,572. Patented May 13, 1890.

WITNESSES
William A. Burr
Charles S. Brintnall

INVENTOR
George E. Hills
by W. E. Hagan Atty

UNITED STATES PATENT OFFICE.

GEORGE E. HILLS, OF TROY, ASSIGNOR TO JAMES K. P. PINE, OF LANSINGBURG, NEW YORK.

MACHINE FOR CUTTING COLLAR OR CUFF BLANKS.

SPECIFICATION forming part of Letters Patent No. 427,572, dated May 13, 1890.

Application filed June 29, 1889. Serial No. 316,022. (No model.)

*To all whom it may concern:*

Be it known that I, GEORGE E. HILLS, of the city of Troy, county of Rensselaer, and State of New York, have invented a new and useful Improvement in Machines for Cutting Collar and Cuff Blanks, of which the following is a specification.

My invention relates to mechanism for cutting collar and cuff blank forms from strips of fabric which are drawn into the apparatus by rollers; and my invention consists (as will be more fully detailed hereinafter in connection with its illustration) of a table containing a die having the form of the blanks to be cut, a reciprocating cutting mechanism that operates in connection with the die to cut the blank forms, a pair of cutting-table rollers operated by connecting-gears to advance the fabric to the die or cutting-table and to stop rotating when the cutting mechanism is reciprocating, a pair of entering-rollers connected by gears to move continuously when the machine is operating, which entering-rollers move slower than the cutting-table rollers to keep the fabric taut, a tension-roller having its bearings in the outer ends of arms which on their inner ends are connected with a shaft having a grooved pulley at each end thereof, with a cord belt and pendent weight, which tension-roller is held down against the force of the weights by the tension produced upon the strip when the entering-rollers and the cutting-table rollers are turning, and which tension-roller rises up under the strip when the cutting-table rollers stop during the movement of the cutting mechanism, so as to hold taut the slack in the fabric until the faster-moving rollers of the cutting-table start to catch up the loop held up by the tension-roller and to pull down the latter, and two rollers which convey from the machine-table the cut blanks.

My invention also consists of the sub-combination of the parts where performing specific function, as will be detailed in the claims.

Accompanying this specification to form a part of it there are seven plates of drawings, containing eleven figures, illustrating my invention, with the same designation of parts by letter-reference used in all of them.

Figure 2:
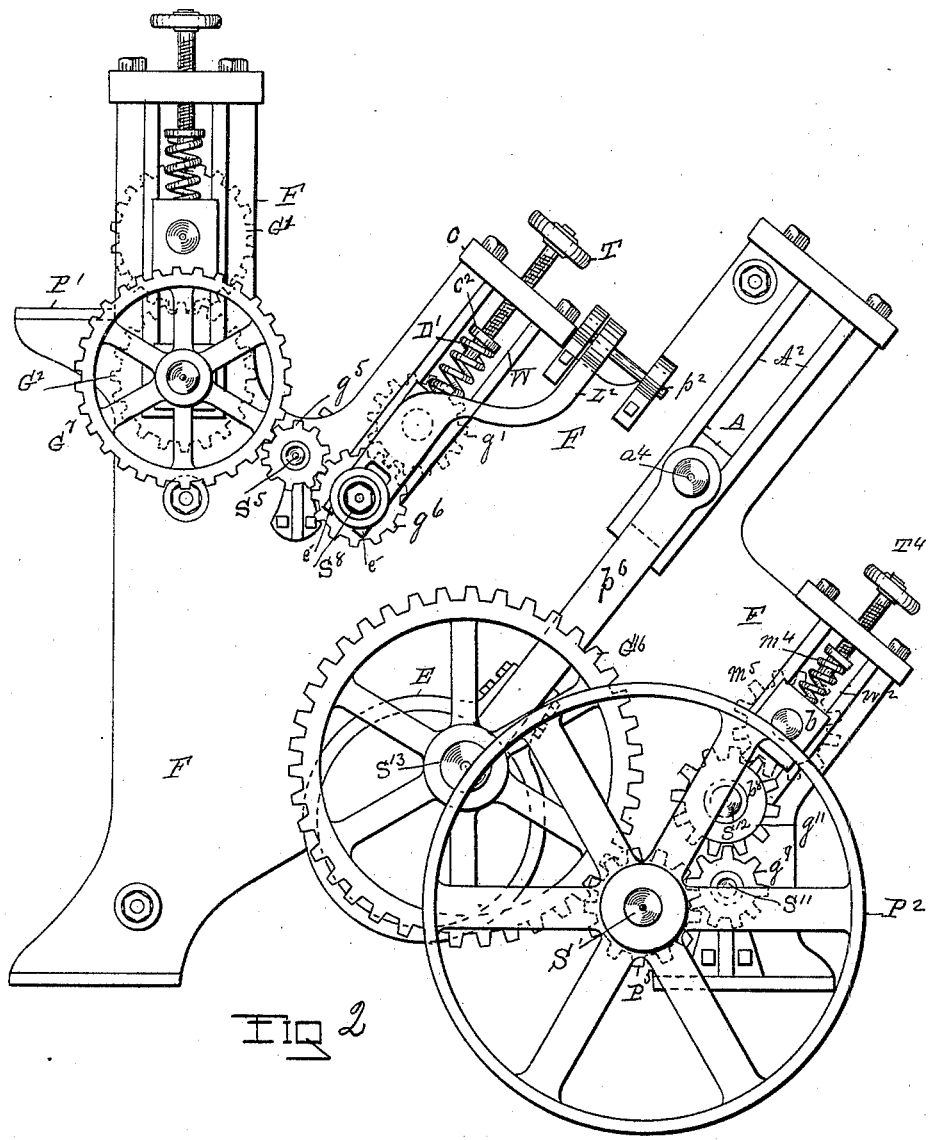
Figure 3:
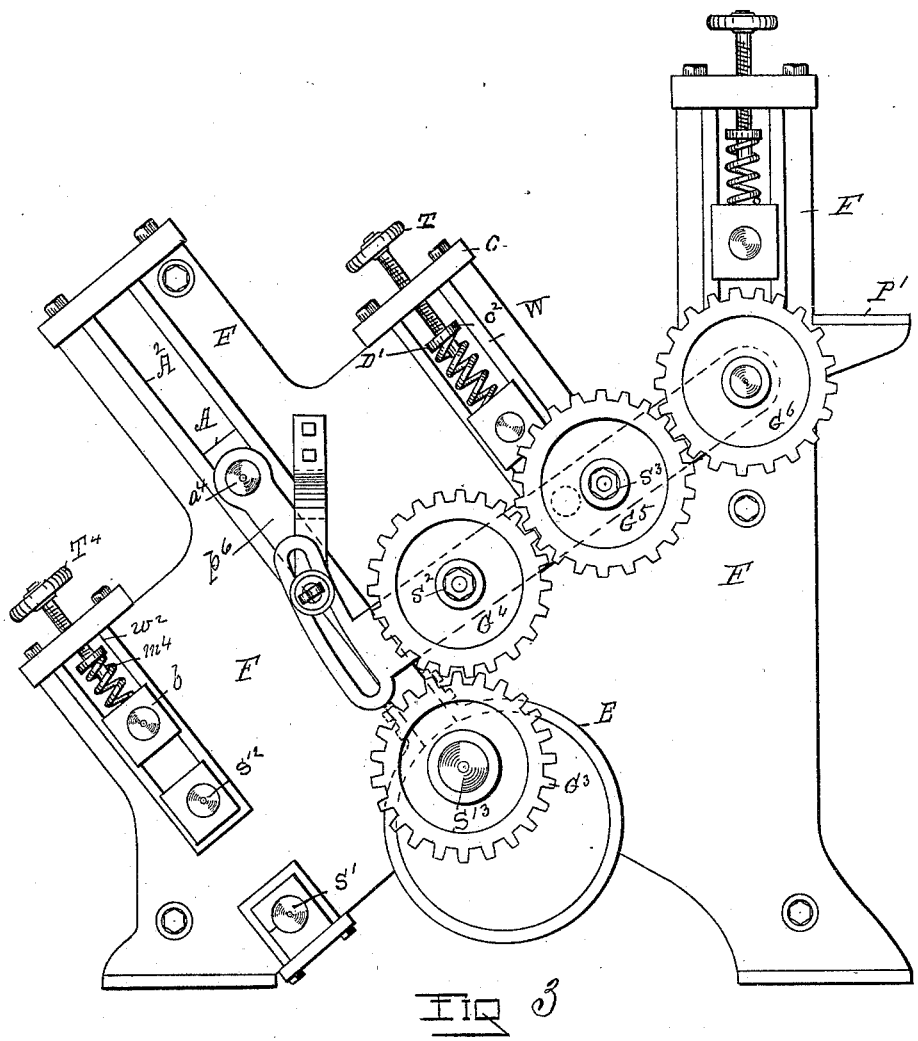
Figure 4:
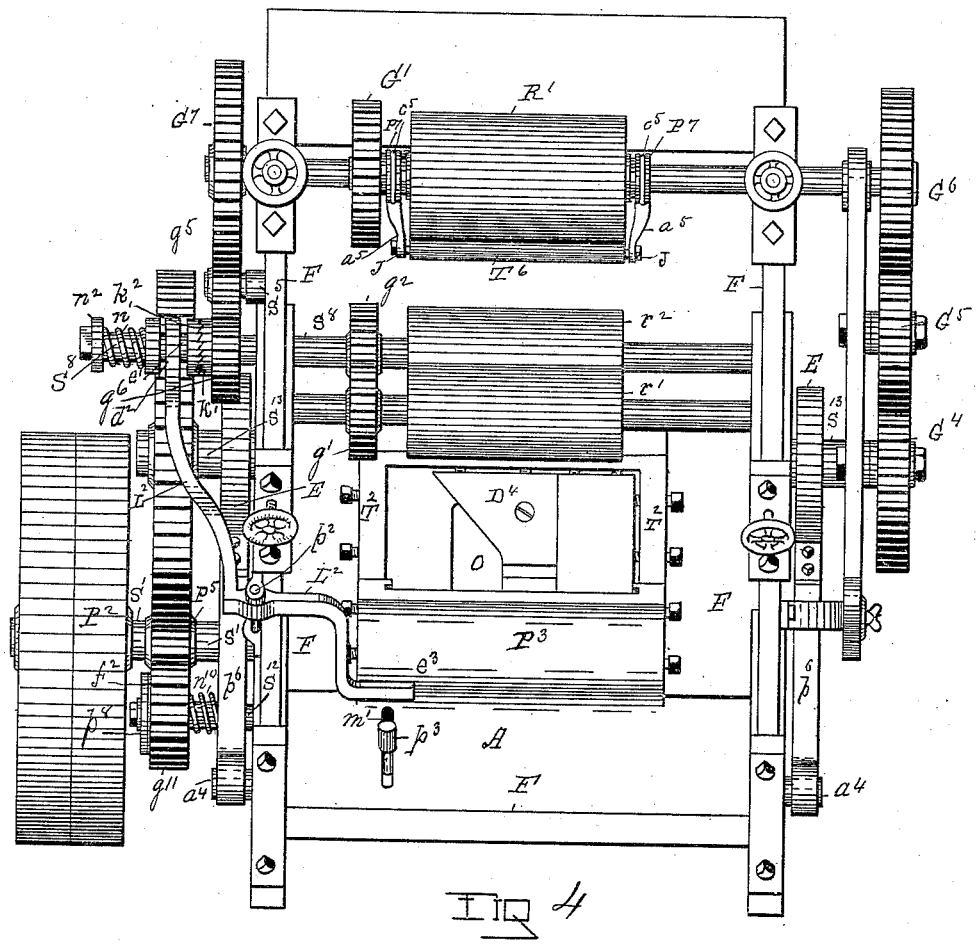
Figure 5:
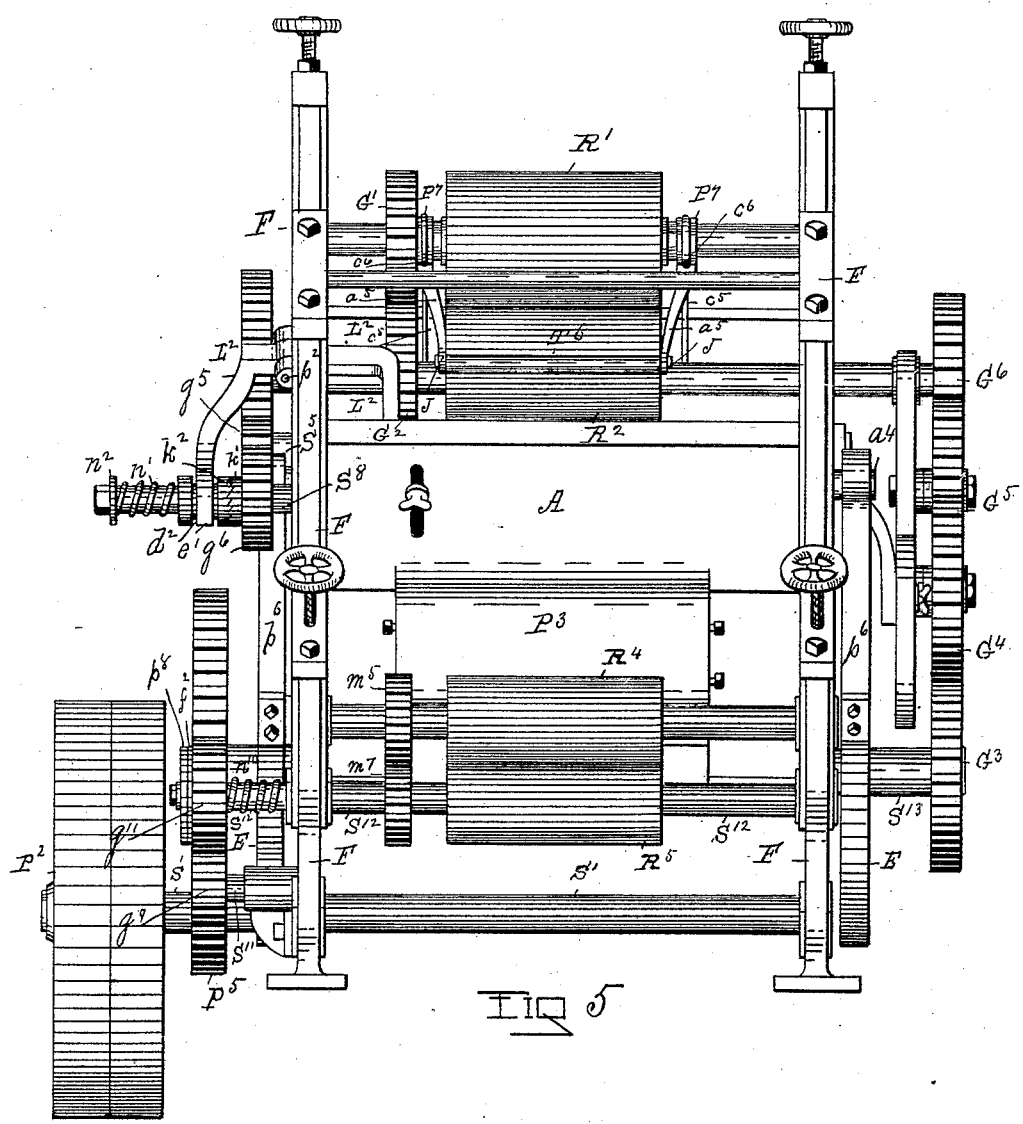
Figure 6:
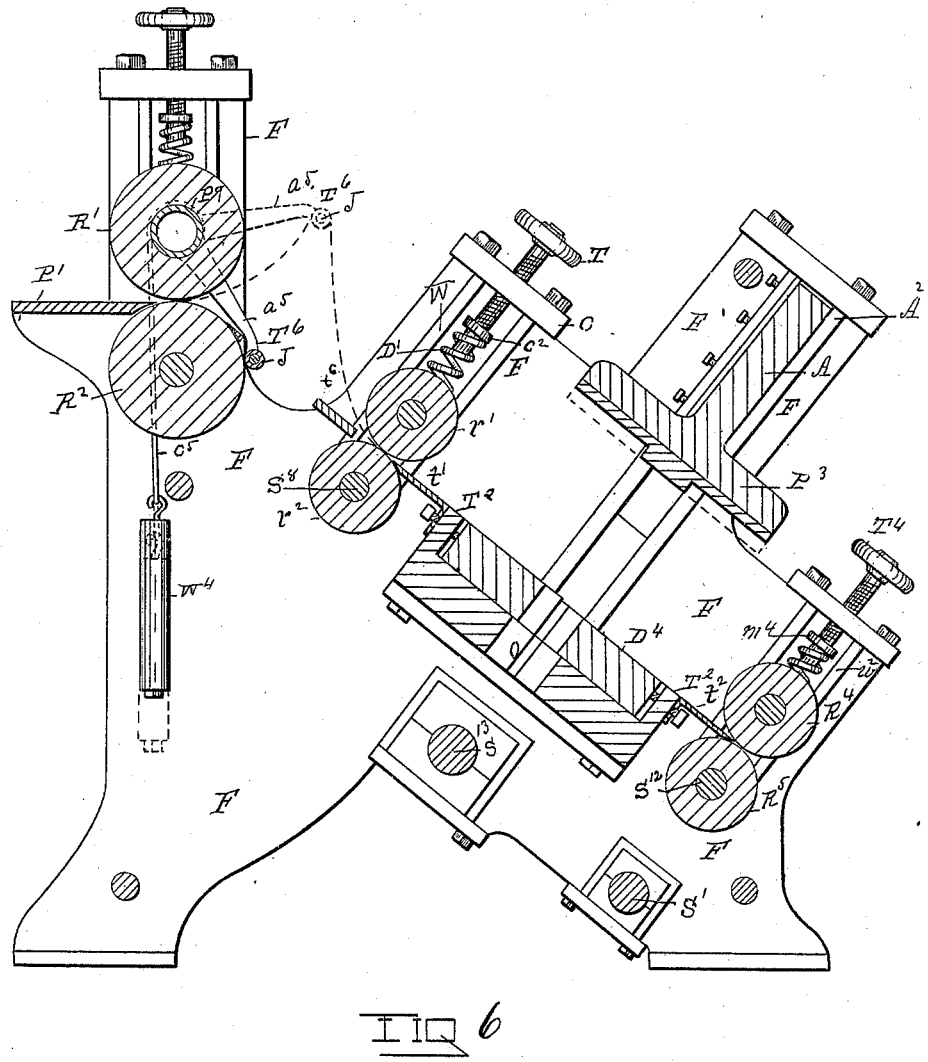
Figure 11:
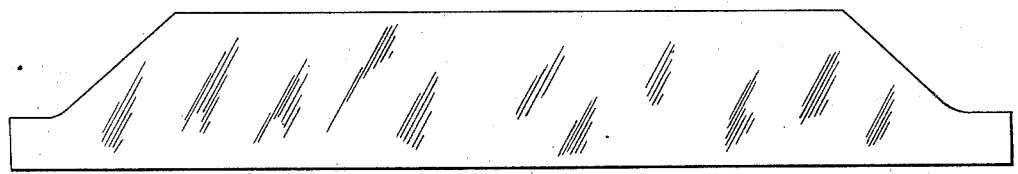
Figure 8:
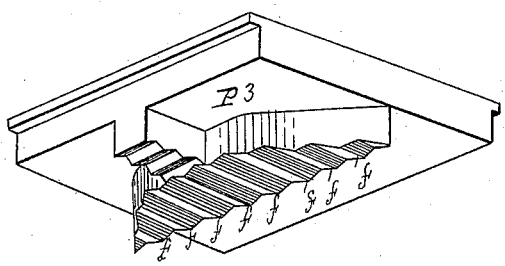
Figure 10:
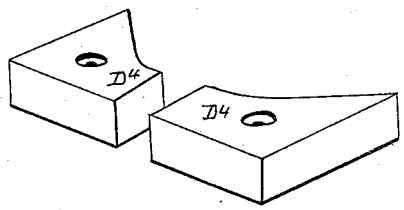
Figure 9:
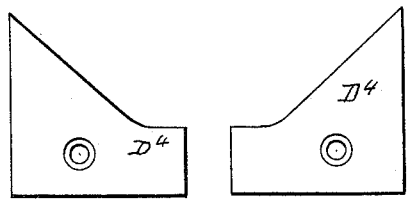
Figure 7:
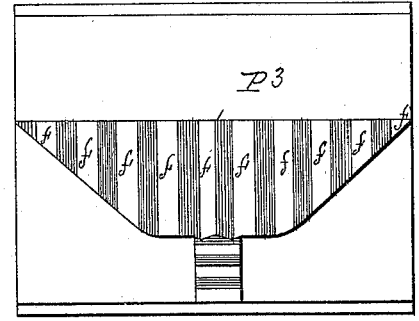

Of the illustrations, Figure 1 is a front view of the mechanism and whereat the fabric strip is entered. Fig. 2 is a side elevation of the mechanism taken upon that side of the mechanism to which the driving-pulley is attached. Fig. 3 is an elevation of that side of the machine which is opposite to that shown at Fig. 2. Fig. 4 is a top view of the machine. Fig. 5 is a rear elevation of the machine. Fig. 6 is a cross-section taken on the line $x'$ $x'$ of Fig. 1. Fig. 7 is a view of the cutting-plate punch with what is its under surface when in position shown as facing the view. Fig. 8 is a perspective of the cutting-punch. Fig. 9 is a plan view of the die. Fig. 10 is a perspective of the die, and Fig. 11 is a plan view of the blank cut by the combined die and punch.

The several parts of the mechanism thus illustrated are designated by letters of reference, and the parts and operation are described as follows:

The letter F designates the frame of the machine, in which the several parts thereof are supported and operated.

The letters $R'$ and $R^2$ designate the entering-rollers, upon the shafts of which at one of each of their adjacent ends there are arranged the gears $G'$ $G^2$, which mesh into each other for synchronous rotation, and $P'$ a platform along and over which the fabric is supplied to the entering-rollers.

The letter $P^2$ designates a driving-pulley which is arranged on the shaft $S'$, and the letter $P^5$ designates a pinion on the latter shaft, which meshes into a gear $G^{16}$ on the shaft $S^{13}$, having on its opposite end the gear $G^3$. This gear $G^3$ meshes into a gear $G^4$ on the pintle-shaft $S^2$, and also into the gear $G^5$ on the pintle-shaft $S^3$, which latter gear meshes into the gear $G^6$ on the shaft of the lower entering-roller $R^2$ to communicate motion to said entering-rollers.

The letters $r'$ and $r^2$ designate the cutting-table rollers, which are connected by gears $g'$ and $g^2$, and arranged to rotate together with alternating periods of rotation and rest, so as to cease rotating when the cutting-punch is descending and to commence rotating when the action of the latter has ceased and the punch commences to reciprocatingly move away from the die. These cutting-table rollers are made to run faster than the entering-rolls for the purpose of catching up that length of fabric which has been passed through the entering-rollers while these cutting-table rollers were at rest, and the latter are operated as follows:

The letter $g^5$ designates a gear running on the pintle-shaft $S^5$, and this gear $g^5$ meshes into a gear $G^7$ on the shaft of the lower roller $R^2$ at that end of the latter which is opposite to that at which it receives power. The gear $g^5$ meshes into a clutch-gear $g^6$, which is arranged on the shaft of the lower roller $r^2$ of the cutting-table rollers outside of its gear $g^2$. The upper one of these rollers (indicated at $r'$) has its journal-boxes arranged in slideways W, made in the frame F. The letters D' designate spiral springs arranged within said slideways, and T set-screws which are threaded into the caps $c$ of the slideways W, with the lower end of these set-screws where projected through the cap provided with a spindle end through which the said springs encircle below a collar $c^2$, made on the spindle, so that the said roller $r'$ is made adjustable in the said slideway to regulate its contact-pressure with the roller $r^2$. The gear $g^6$ (which is arranged on the shaft $S^8$ of the lower roller $r^2$ outside of the gear $g^2$, which meshes into the gear $g'$ of the upper roller $r'$) turns loosely upon said shaft $S^8$, and this gear $g^6$ is made with a clutch part $k'$ on its outer face, and the letter $k^2$ designates clutch part that is attached to so as to move with said shaft $S^8$, and thus actuate the gears $g^2$ and $g'$ of the cutting-table rollers. This clutch part $k^2$ turns with the shaft $S^8$ and is constructed with an encircling recess $d^2$.

The letter $L^2$ designates a shipping-lever, which is pivoted at $p^2$, and its end $e'$ encircles the shaft $S^8$ within the recess $d^2$, so that the shaft will turn therein. This shipping-lever $L^2$ at its end $e^3$ is constructed to engage with the pin $p^3$ on the upcast arm A of the punch or cutter $P^3$, so that as the latter begins to descend to cut the blank this pin $p^3$ engages with the end $e^3$ of the lever $L^2$ and forces the outer end of the said lever outwardly to move the clutch part $k^2$ away from its engagement with the clutch part $k'$, so as to stop the rotation of the rolls $r'$ $r^2$ of the cutting-table. When this lever so moves outwardly the clutch part $k^2$, it does so against the force of the spiral spring $n'$, encircling the shaft $S^8$ between the nut $n^2$ and the said clutch part $k^2$, which spring, after the disengagement of the lever $L^2$ with the pin $p^3$, forces the clutch parts $k'$ and $k^2$ together, so as to again rotate the rollers $r'$ $r^2$.

The letter $T^2$ designates the die-table, and $t'$ a lateral extension of the latter leading to the rollers $r'$ and $r^2$, and $t^2$ a lateral extension of the same leading to the rollers $R^4$ $R^5$, from which the blanks when cut are delivered. This table is provided with a die $D^4$, which is sunk into its upper surface, and this table is secured to the frame F of the machine.

The letter $P^3$ designates the cutter or punch, which on its lower face is formed to enter the die-sink, so that where entering the die the edges of the punch and the die will make a shear engagement, and the entering-face of the punch is furrowed at $f$ to give to its cutting-edges a serrated form to facilitate their cutting action.

The letter A designates, as shown at Fig. 6, the guide-arm of the punch, which extends across the back of the latter from side to side, and the letters $A^2$ slideways in which said punch is reciprocated.

The letter E designates an eccentric on each end of the shaft $S^{13}$, and $G^{16}$ a gear-wheel arranged on said shaft, and the letter $P^5$ a pinion on the driving-pulley hub adapted to mesh into said gear $G^{16}$ to actuate said shaft $S^{13}$. The letter $p^6$ designates a pitman which is connected with the eccentric E on each end of said shaft $S^{13}$, and each of these pitmen at their upper ends are, at $a^4$, journaled onto the arm A of the punch to reciprocatingly operate the latter with the guide-arm A, having the pin $p^3$, to operate the lever $L^2$, as before described.

The letters $R^4$ and $R^5$ designate the discharging-rollers, the upper one of which rollers is constructed with its journal-boxes $b$ adjustable in slideways $w^2$ by means of set-screws $T^4$ and a spring $m^4$ to regulate the pressure with which said rollers engage on their cylindrical faces. These rollers are connected by gears $m^5$ and $m^7$, by which motion is communicated from one to the other.

The letter $g^9$ designates a gear having a pintle-shaft $S^{11}$, and this gear $g^9$ meshes into the pinion $P^5$ on the hub of the driving-pulley $P^2$ to receive power therefrom, and also meshes into the friction-gear $g^{11}$, arranged on the outer end of the shaft $S^{12}$ of the lower roller $R^5$ outside of the gear $m^7$. This friction-gear $g^{11}$ on the shaft $S^{12}$ of the lower roller $R^5$ outside of its gear $m^7$ is made to turn loosely on said shaft, and is caused to turn with and so as to actuate the latter by means of a plate $p^8$, attached to the outer end of said shaft, a leather packing $f^2$ on the outer face of said gear-wheel $g^{11}$, and a spiral spring $n^{10}$, encircling said shaft $S^{12}$ between said gear $g^{11}$ and the frame F, as shown at Figs. 2, 4, and 5. The function of this friction-gear is to regulate the tension upon the strip between said rollers $R^4$ and $R^5$ and the cutting-table rollers $r'$ $r^2$, so that the said rollers $R^4$ and $R^5$ will slip when the proper tension is had, with its measure regulated by the set-screw $T^4$, as before described.

The letter $T^6$ designates a tension-roller, which at each end J is journaled into the arm $a^5$, and each of these arms $a^5$ connects with a grooved pulley $P^7$, arranged to turn on the shaft of the upper roller. The letter $c^5$ designates a cord, which at $c^6$ is attached to said pulley where passing over the latter, said cords each having an attached weight $W^4$. The function of this roller $T^6$ and its connection, as thus described, is as follows: When the strip of fabric between the entering-rollers is taut, the tension thereon keeps down the roller $T^6$; but when the rollers $r'$ and $r^2$ have ceased to operate, with the rollers $R'$ and $R^2$ continuing to turn, then the roller $T^6$, by the action of the weights $W^4$, rises up under the fabric to keep it taut until the cutting or punching is completed and the rollers $r'$ and $r^2$ commence to turn, which, moving faster than the entering-rollers, soon take up the loop held by the tension-roller to straighten out the strip and pull down the roller $T^6$.

The operation of the mechanism thus described is as follows: Power being applied to the driving-pulley and a strip of fabric being entered between the rollers $R'$ and $R^2$, it is moved along by the latter onto the table part $t^6$ until caught by the rollers $r'$ and $r^2$, by which it is drawn taut and progressed over the table extensions $t'$ and $t^2$ until caught between the rollers $R^4$ and $R^5$, when by the action of the eccentric E the punch or cutter is caused to descend, and by means of the tripping-pin $p^3$ the lever $L^2$ is operated to disengage the clutch parts $k'$ and $k^2$ when the rollers $r'$ and $r^2$ cease to rotate, the punch descending to enter the die and cut the strip. When the punch commences to rise, the pin $p^3$ disengages from the lever $L^2$. The spring on the shaft of the lower roller $r^2$ causes the clutch parts $k'$ and $k^2$ to engage and to rotate the rollers $r'$ and $r^2$ to again draw upon the strip. As the latter rollers move faster than the rollers $R'$ and $R^2$, they soon catch up the slack held up by the tension-roller $T^6$, while the rollers $R^3$ and $R^4$ receive the cut blank form and discharge it from the machine.

The letter O designates an opening through which the trimmings, if any, are made to pass. The punch and die operating in connection therewith are arranged to cut out from a strip of material as passed through the machine the form of the ends of the two collar-blanks, and with each reciprocation to finish up the end of one previously cut and cut the entering end of a succeeding blank; but the shape of the cutting or punching mechanism as to the form to be cut by the latter may be varied, and I do not limit my invention in its application to the form of the die or punch shown, the only limit being that the means for operating the punch or cutting mechanism, together with the means shown for moving and controlling the fabric strip, shall be substantially the same.

Having thus described my invention, what I claim, and desire to secure by Letters Patent, is—

1. In a machine for cutting collar or cuff blank forms from fabric, the combination, with a table provided with a die having the form of the blanks to be cut, of a cutter or punch reciprocatingly operated to make a cutting engagement with said die, a pair of rollers connected by gears to be rotated to move the fabric over said die and caused to cease rotating when said punch or cutter is engaging with the die, and a pair of rollers having a friction-clutch and arranged to engage with the fabric while being cut and to convey away the cut blanks, substantially in the manner as and for the purposes set forth.

2. The combination, with the table T, having the die $D^4$, of the punch or cutter $P^3$, made with the guide-arm A, constructed with the pin $p^3$, and operated to be reciprocated in a slideway, substantially as described, the rollers $r'$ and $r^2$, having connecting-gears, the gear $g^6$, arranged to turn loosely on the shaft of one of said rollers and constructed with the clutch part $k'$, the clutch part $k^2$, arranged on and connected to so as to turn with the shaft having thereon the gear $g^6$, the spring $n'$, arranged on the said shaft, and the pivoted lever $L^2$, constructed to engage with the said pin $p^3$ and the clutch part $k^2$, substantially in the manner as and for the purposes set forth.

3. In a machine for cutting collar and cuff blank forms from fabric, the combination of the entering-rollers $R'$ and $R^2$, the tension-roller $T^6$, the die-table T, made with a cutting-die on its upper face, the reciprocating punch or cutter $P^3$, having the guide-arm A, made with the pin $p^3$, the rollers $r'$ and $r^2$, connected by gears to rotate together and operated by a loose gear having a clutch part on its outer face, with a clutch part and spring arranged on the shaft of that one of the last-named rollers having the said loose gear, the pivoted lever $L^2$, and the rollers $R^4$ and $R^5$, all constructed and arranged to operate substantially as shown and described.

Signed at the city of Troy, this 22d day of May, 1889, in the presence of the two witnesses whose names are hereto written.

GEORGE E. HILLS.

Witnesses:
CHARLES S. BRINTNALL,
W. E. HAGAN.